R. E. DICE.
FOLDING STAND.
APPLICATION FILED APR. 17, 1920.
1,392,486.
Patented Oct. 4, 1921.
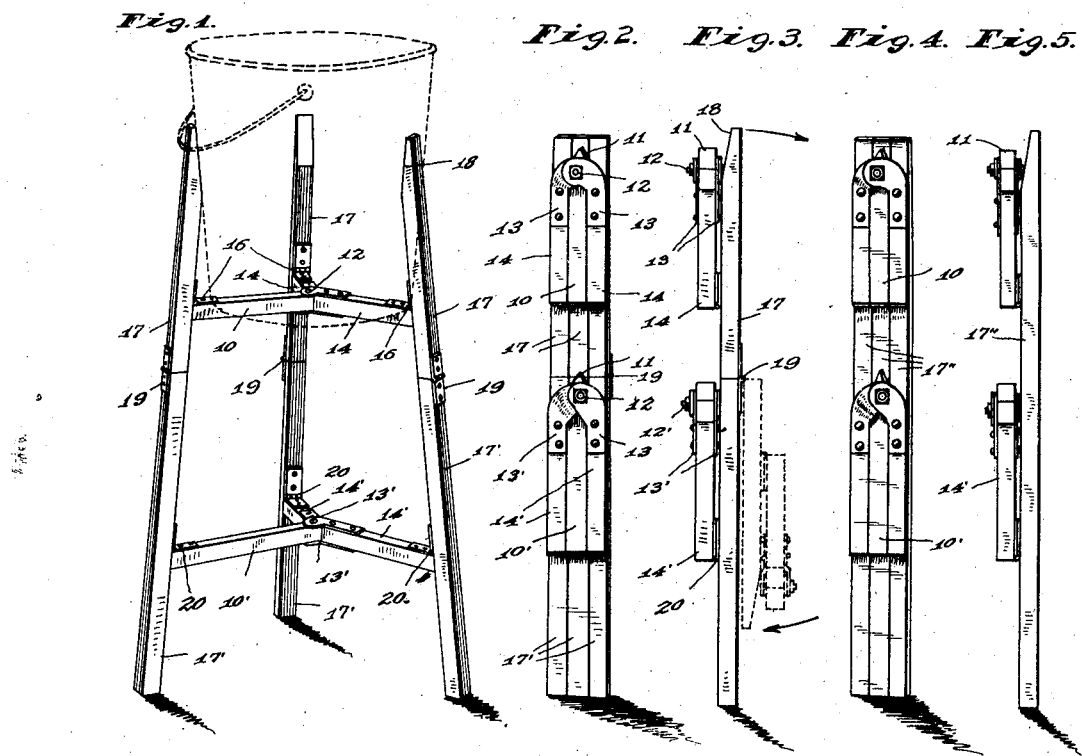
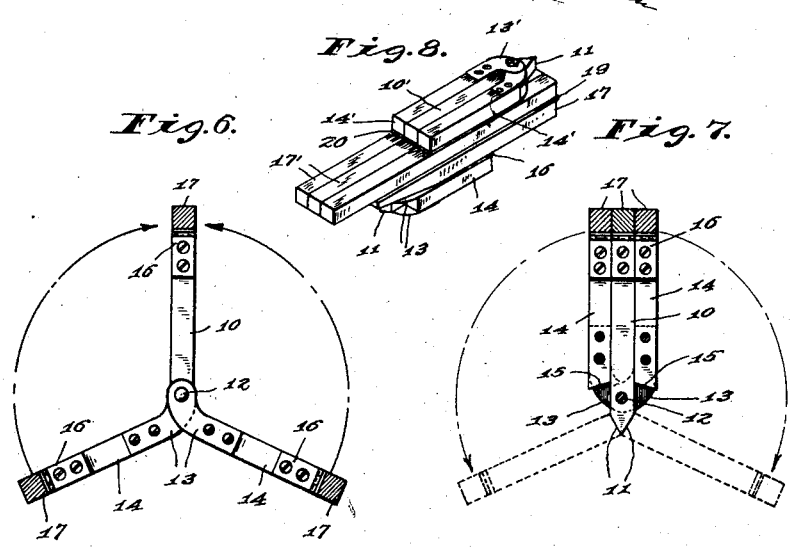
Witness
Frank A. Sahle
Inventor
Robert E. Dice,
By Hood & Schley
Attorneys

UNITED STATES PATENT OFFICE.

ROBERT E. DICE, OF INDIANAPOLIS, INDIANA.

FOLDING STAND.

1,392,486.  Specification of Letters Patent.  Patented Oct. 4, 1921.

Application filed April 17, 1920. Serial No. 374,640.

*To all whom it may concern:*

Be it known that I, ROBERT E. DICE, a citizen of the United States, residing at Indianapolis, in the county of Marion and State of Indiana, have invented a new and useful Folding Stand, of which the following is a specification.

The object of my invention is to produce a cheap, simple and efficient foldable structure, capable of firmly supporting objects, such as paste pails, tubs, flower pots, workboards, such as plasterers' boards, etc.

The accompanying drawings illustrate my invention. Figure 1 is a perspective view of my device expanded and especially formed for the reception and support of a paste pail, such as paper hangers use; Fig. 2 is a front elevation of the structure, in partially folded condition; Fig. 3 is a side elevation of the parts as shown in Fig. 2; Fig. 4 is a front elevation, similar to Fig. 2, of a slightly modified form; Fig. 5 a side elevation of Fig. 4; Fig. 6 is a horizontal section of the apparatus just above the horizontal connectors, with the parts expanded; Fig. 7 is a view similar to Fig. 6, with the parts in first folded position; Fig. 8 is a perspective view of the structure shown in Fig. 1, in folded condition.

In the drawings, 10 indicates a cross brace, one end of which is beveled at 11 for a purpose which will appear. Adjacent the beveled end, brace 10 carries a pivot pin 12, upon which are pivoted slightly curved hinge plates 13, 13, carrying braces 14, 14, which are so proportioned that, when lying parallel with each other, as shown in Fig. 7, their ends will be in the same plane as the adjacent end of brace 10. The hinge ends of braces 14 are beveled, as indicated at 15, so that when swung to the position shown in Fig. 6, they will coöperate with the bevels 11 of brace 10, so as to lie substantially 120 degrees from brace 10, as indicated in dotted lines in Fig. 7.

Hinged by hinges 16, to braces 10, 14 and 14, are legs 17 which, at their upper ends, are formed for the reception of the article to be supported. In the form shown in Fig. 1, these ends are beveled, as indicated at 18, so as to coöperate with the pail, indicated in dotted lines, and be held against collapse.

Hinged to the lower end of each leg 17, in the form shown in Fig. 1, is a leg extension 17', the connection being made by a hinge 19 applied to the outer faces of the leg sections 17 and 17'.

Hinged at 20 to the inner faces of the several leg sections 17' is a series of braces 10' and 14', 14', like braces 10 and 14, 14, hinged together by hinges 13', like hinges 13.

With this construction, it is apparent that, starting with the parts in the positions shown in Fig. 1, they may be first folded to the position indicated in Figs. 2 and 7. Thereupon, as the brace members will then lie parallel to each other and in the same plane, and their hinges will be in alinement, the braces of each group may be folded upwardly into planes parallel with the plane of the legs, as shown in Fig. 3, and that then the two leg section groups may be swung from their hinges until the parts come into the positions indicated in Fig. 8, thus producing an exceedingly compact small-dimension group, which may be readily stored in the tool bag, or otherwise.

It will also be apparent that, if a less compact grouping be desired, the hinges 19 may be omitted and continuous leg sections 17'' be used, as indicated in Figs. 4 and 5.

I claim as my invention:

1. A foldable stand comprising a group of braces hinged together so as to occupy parallel or radiating positions, a leg member hinged to each brace, the brace members being so proportioned when folded into parallel position that the leg hinges will be alined, leg extensions hinged to said legs, and a group of braces, similar to the aforesaid braces, hinged to the leg extensions.

2. A foldable stand comprising a group of braces hinged together so as to occupy parallel or radiating positions, a leg member hinged to each brace, the brace members being so proportioned when folded into parallel position that the leg hinges will be alined, and leg extensions hinged to said legs.

3. A foldable stand comprising a group of three braces, the middle one of which is longer than the other two and oppositely beveled at one end, hinge members overlapping and pivoted to said longer brace by a single pivot pin adjacent its beveled end, and connected to the short braces so that said short braces may be laid to flank the longer member on either side and may be swung to radiating positions co-acting with the beveled end of the longer member, and legs hinged to the outer ends of the braces upon axes permitting the legs to fold flat against their braces.

In witness whereof, I have hereunto set my hand at Indianapolis, Indiana, this 15th day of April, A. D., one thousand nine hundred and twenty.

ROBERT E. DICE.